July 15, 1969  G. C. COLLINS ET AL  3,456,140

DYNAMOELECTRIC MACHINE COOLING

Filed Oct. 5, 1966

INVENTORS
George C. Collins &
Charles H. Lacey

C. L. Meland
ATTORNEY

United States Patent Office 3,456,140
Patented July 15, 1969

3,456,140
DYNAMOELECTRIC MACHINE COOLING
George C. Collins, Pendleton, and Charles H. Lacey, Anderson, Ind., assignors to General Motors Corporation, Detroit, Mich., a corporation of Delaware
Filed Oct. 5, 1966, Ser. No. 584,427
Int. Cl. H02k 1/20, 9/19
U.S. Cl. 310—54
4 Claims

ABSTRACT OF THE DISCLOSURE

A cooling arrangement for a dynamoelectric machine for cooling the field coil and stator winding of the machine. The machine has an outer frame and a tubular part that extends axially through the frame to separate the interior of the machine into an outer liquid tight cooling area and an inner area free of cooling medium. The rotor of the machine is located in the inner area while the stator winding and field coil are located in the outer cooling area. A cooling medium is circulated through the outer cooling area and the path for the cooling medium is through the slots of the magnetic core carrying the stator winding.

---

This invention relates to a cooling arrangement for cooling the stator and field windings of a dynamoelectric machine such as an electric motor for propelling a vehicle.

One of the objects of this invention is to provide a cooling arrangement for a dynamoelectric machine of the type that includes a rotor, a stator and a field winding the arrangement being such that the area containing the field and stator winding is separated from the rotor and such that coolant is applied directly to the field winding and then to the stator winding.

Another object of this invention is to provide a cooling arrangement for a dynamoelectric machine that includes a fixed stator and field winding where coolant is applied directly to the field winding and is then directed over the stator winding through the slots of the stator laminations.

Another object of this invention is to provide a cooling arrangement for a dynamoelectric machine where the coolant is applied directly to a field winding which is disposed between two stacks of stator laminations, the coolant then being directed axially of the machine through the slots of the laminations and in contact with the conductors of the stator winding, the coolant leaving the machine through a path connected with opposite ends of the stator winding.

Further objects and advantages of the present invention will be apparent from the following description, reference being had to the accompanying drawings wherein preferred embodiments of the present invention are clearly shown.

Figure 1:
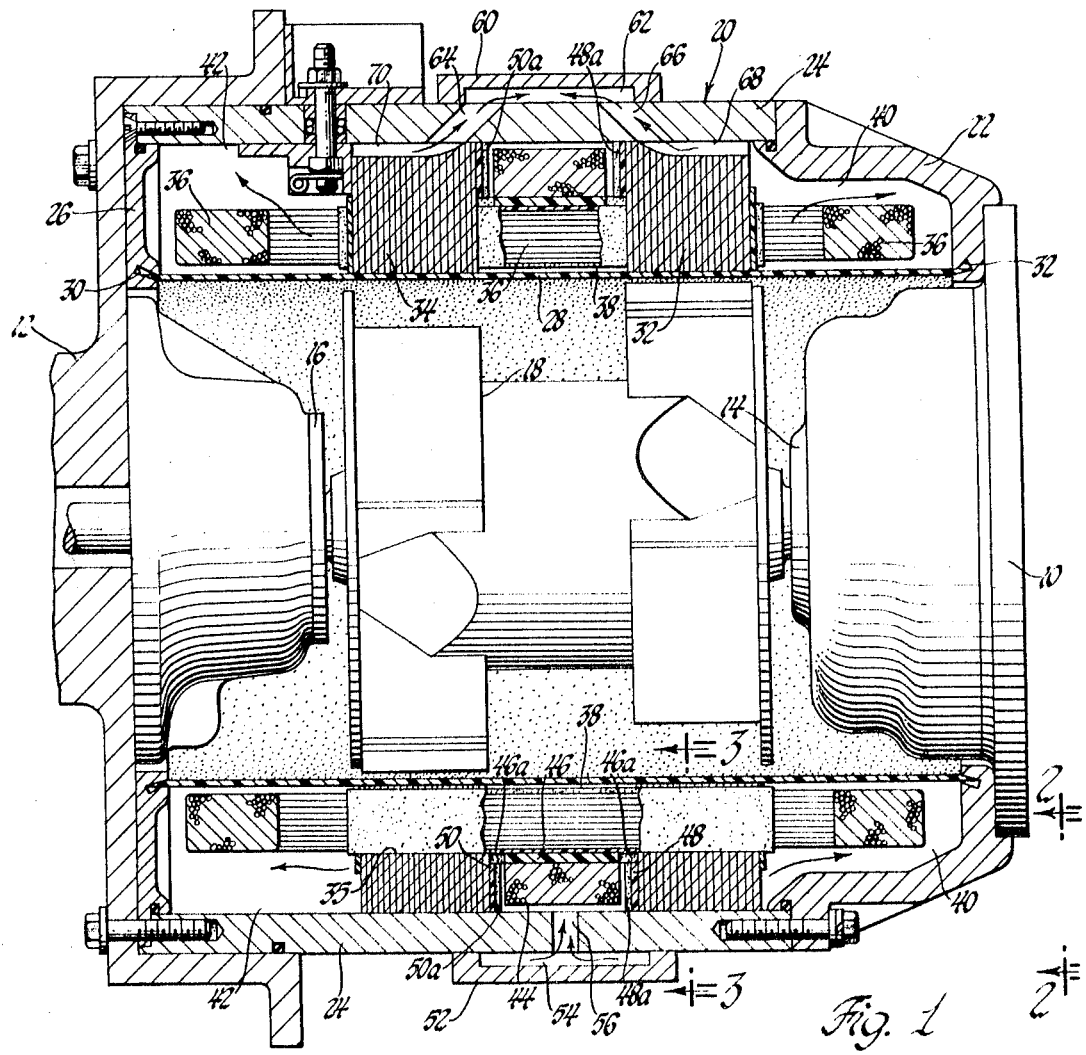
FIGURE 1 is a sectional view of a dynamoelectric machine made in accordance with this invention.

Referring now to the drawings and more particularly to FIGURE 1, the reference numerals 10 and 12 designate end frames for a dynamoelectric machine which in this case is an electric motor. The end frames 10 and 12 support bearings 14 and 16 that are utilized to rotatably support a rotor generally designated by reference numeral 18.

The dynamoelectric machine includes a stator assembly which is generally designated by reference numeral 20. This assembly includes frame parts 22, 24 and 26 which are connected together as shown and a tubular nonmagnetic part designated by reference numeral 28. The parts 22, 24, 26 and 28 form a sealed chamber since the ends of the tublar part 28 are tightly fitted within slots 30 and 32 formed respectively in parts 26 and 22. This fluid tight connection with the part 28 is provided by forming annular grooves in the parts 22 and 26, fitting the ends of the tublar part 28 in the grooves and then swaging over the material of the parts 22 and 26 to form a fluid tight fit. To further insure a fluid tight fit, a sealant such as an epoxy resin can be utilized.

The frame 24 supports two axially spaced stacks of steel laminations 32 and 34. These stacks of laminations have a plurality of circumferentially spaced and radially inwardly extending stator slots 35 which receive the windings 36 that form the stator coil. These windings project through the annular space 38 located between the stator laminations 32 and 34 and the ends of these windings are located in annular areas designated by reference numerals 40 and 42. The open ends of the stator slots are closed by the nonmagnetic tube 28 as can be seen from an inspection of FIGURES 1 and 3.

The dynamoelectric machine of this invention has a field coil 44 which is wound on an annular coil form 46. This field coil preferably is formed of copper foil and the field coil is disposed between annular insulators 48 and 50. The insulators 48 and 50 have a plurality of circumferentially extending slots 48a and 50a the purpose of which will be more fully described hereinafter. The insulator 46 is provided with matching slots 46a which permit coolant to enter the area 38 all of which is more fully described hereinafter.

Figure 3:
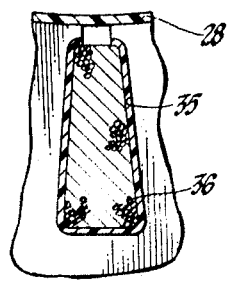
FIGURE 3 is a sectional view taken along line 3—3 of FIGURE 1.

The stator slots 35 and their relationship to the tubular member 28 is illustrated in the sectional view of FIGURE 3. It is seen that the slots not only serve to support the conductors 36 but also serve to connect the chamber 38 with the end areas 40 and 42.

Figure 2:
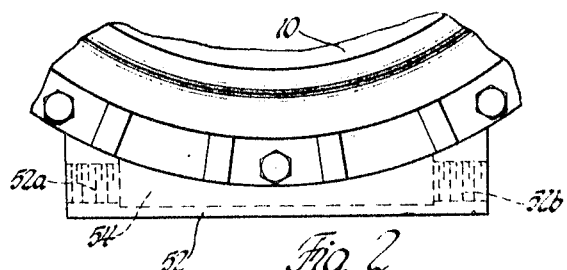
FIGURE 2 is a partial end view of the dynamoelectric machine shown in FIGURE 1 illustrating the inlet manifold for cooling oil that is supplied to the dynamoelectric machine.

The dynamoelectric machine has an inlet manifold 52 which is secured to the frame 24 as is illustrated in FIGURES 1 and 2. This inlet manifold has opposed threaded openings 52a and 52b one of which is connected with a pipe to supply a cooling medium to the chamber 54. One of the threaded openings 52a or 52b is plugged and the other opening is connected with an inlet pipe coming from a source of coolant such as a source of cooling oil. By providing opposed threaded openings, it is possible to connect the pipes to either side of the motor depending upon its position when in use.

The chamber 54 is in communication with a passage 56 formed in the frame 24 and this passage communicates with an area located immediately adjacent the exterior of the field coil 44.

The dynamoelectric machine has an exhaust manifold designated by reference numeral 60 which is attached to frame 24 and which provides a chamber 62 that communicates with passages 64 and 66 formed in the frame 24. The passage 66 communicates with a groove 68 formed in the lamination stack 32 and this groove communicates with the chamber 40. In a similar fashion, the passage 64 communicates with a groove 70 formed in lamination stack 34 and this groove connects the passage 64 and the chamber 42.

When the motor is operating, the stator winding 36 is supplied from a suitable source of alternating current and the field winding 44 is supplied from a source of direct current. The inlet chamber 54 is connected with the outlet side of a coolant pump which is not illustrated and the coolant is forced through the passage 56 into the annular area surrounding the field coil 44. The cooling medium flows around the ends of the field coil 44 and is in intimate contact with the ends of the field coil. This flow is through the grooves 48a and 50a formed in the insulators 48 and 50. The coolant then flows through the grooves 46a formed in the annular insulator 46 into the chamber 38. The coolant then flows axially through the slots 35 formed in the stacks of laminations 32 and 34 into the chambers 40 and 42. From here, the coolant is directed into the exhaust chamber 62 through two paths. One of these paths is through the grooves 70 and 64 and the other path is through the grooves 68 and 66. The chamber 62 is connected with an exhaust pipe for the system which returns the coolant to the inlet side of the pump. If desired, the coolant can be forced through a heat exchanger during the recirculation of the cooling medium.

The arrangement for cooling the field winding 44 and the stator conductors 35 provides maximum cooling for these windings since the cooling medium flows in direct contact with the outer side and side edges of the winding 44 and also flows in contact with the stator conductors 36 that are positioned in the chamber 38, the slots of the stator laminations and the chambers 40 and 42. By providing the tubular member 28, the area that is supplied with cooling medium is separated from the area containing the rotor 18 so that the rotor is not impeded in its movement by coolant. This is to be distinguished from certain oil cooling arrangements where the rotor rotates in the cooling medium that is utilized to cool the windings of the dynamoelectric machine.

The coil winding 36 can be formed of bar conductors rather than wires if so desired as long as sufficient space is provided in the slots 35 for the passage of cooling medium.

While the embodiments of the present invention as herein disclosed constitute a preferred form, it is to be understood that other forms might be adopted.

What is claimed is as follows:

1. A cooling arrangement for a dynamoelectric machine comprising, a frame means, a tubular member extending axially through said frame means and secured thereto with a liquid tight fit, said frame means and tubular member defining an annular cooling area, a rotor rotatable within said tubular member, first and second axially spaced stator cores disposed within said cooling area defining a first chamber therebetween, the inner faces of said stator cores engaging the outer wall of said tubular member, a field coil located in said first chamber, a stator winding supported in slots formed in said stator cores including conductors extending through said first chamber, a cooling medium inlet formed in said frame means located in alignment with said field coil and communicating with said first chamber, second and third chambers located at the ends of said cooling area and defined by said frame means and said stator cores, an outlet passage for said cooling medium, and means connecting said second and third chambers with said outlet passage, said slots in said stator cores and said tubular member forming passage means connecting said first chamber that contains said field coil and a part of said stator winding with said second and third chambers whereby cooling medium directed against said field coil flows into said second and third chambers through said slots in said stator cores, said rotor located within an area that is separate from said cooling area whereby its rotation is not impeded by cooling medium in said cooling area.

2. The cooling arrangement according to claim 1 where the means for connecting said second and third chambers to said outlet passage includes grooves formed in said stator cores.

3. The cooling arrangement according to claim 1 where passage means are provided for directing cooling fluid against the edges of said field coil from the inlet of said dynamoelectric machine.

4. The cooling arrangement according to claim 1 where said field coil is supported by a coil form that has grooves for connecting the inlet of the dynamoelectric machine with said stator slots.

References Cited

UNITED STATES PATENTS 3,176,175    3/1965    Jaeschke _____ 310—54

MILTON O. HIRSCHFIELD, Primary Examiner

R. SKUDY, Assistant Examiner

U.S. Cl. X.R.

310—59